(12) United States Patent
Gruver et al.

(10) Patent No.: US 9,086,273 B1
(45) Date of Patent: Jul. 21, 2015

(54) MICROROD COMPRESSION OF LASER BEAM IN COMBINATION WITH TRANSMIT LENS

(71) Applicant: Google Inc., Mountain View, CA (US)

(72) Inventors: Daniel Gruver, San Francisco, CA (US); Pierre-Yves Droz, Mountain View, CA (US); Gaetan Pennecot, San Francisco, CA (US); Zachary Morriss, San Francisco, CA (US); Dorel Ionut Iordache, Walnut Creek, CA (US)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 13/790,251

(22) Filed: Mar. 8, 2013

(51) Int. Cl.
*G01C 3/08* (2006.01)
*G01C 3/02* (2006.01)

(52) U.S. Cl.
CPC .......................................... *G01C 3/02* (2013.01)

(58) Field of Classification Search
CPC ......... G01S 17/10; G01S 7/497; G01S 17/89; G01S 7/487; G01C 3/08
USPC ......... 356/3.01, 4.01, 4.07, 5.01, 5.09, 9, 625
See application file for complete search history.

(56) References Cited

U.S. PATENT DOCUMENTS

| | | | |
|---|---|---|---|
| 3,790,277 A | 2/1974 | Hogan | |
| 4,700,301 A | 10/1987 | Dyke | |
| 4,709,195 A | 11/1987 | Hellekson et al. | |
| 4,801,201 A | 1/1989 | Eichweber | |
| 5,202,742 A | 4/1993 | Frank et al. | |
| 6,108,094 A * | 8/2000 | Tani et al. | 356/417 |
| 7,089,114 B1 | 8/2006 | Huang | |
| 7,248,342 B1 | 7/2007 | Degnan | |
| 7,255,275 B2 | 8/2007 | Gurevich et al. | |
| 7,688,348 B2 | 3/2010 | Lubard et al. | |
| 7,701,558 B2 | 4/2010 | Walsh et al. | |
| 7,710,545 B2 | 5/2010 | Cramblitt et al. | |
| 7,969,558 B2 | 6/2011 | Hall | |
| 2005/0237519 A1 * | 10/2005 | Bondurant et al. | 356/241.1 |
| 2007/0268474 A1 * | 11/2007 | Omura et al. | 355/67 |
| 2008/0100820 A1 * | 5/2008 | Sesko | 356/4.01 |
| 2009/0059183 A1 * | 3/2009 | Tejima | 353/69 |
| 2009/0147239 A1 | 6/2009 | Zhu et al. | |
| 2011/0058167 A1 * | 3/2011 | Knox et al. | 356/338 |
| 2011/0216304 A1 | 9/2011 | Hall | |
| 2011/0255070 A1 * | 10/2011 | Phillips et al. | 356/4.01 |
| 2013/0114077 A1 * | 5/2013 | Zhang | 356/328 |

OTHER PUBLICATIONS

OSRAM Opto Semiconductors GmbH, Datasheet for SPL DL90_3 Nanostack Pulsed Laser Diode, Mar. 24, 2009.

* cited by examiner

*Primary Examiner* — Isam Alsomiri
*Assistant Examiner* — Samantha K Abraham
(74) *Attorney, Agent, or Firm* — McDonnell Boehnen Hulbert & Berghoff LLP (57) ABSTRACT

A LIDAR device may transmit light pulses originating from one or more light sources and may receive reflected light pulses that are detected by one or more detectors. The LIDAR device may include a lens that both (i) collimates the light from the one or more light sources to provide collimated light for transmission into an environment of the LIDAR device and (ii) focuses the reflected light onto the one or more detectors. Each light source may include a respective laser diode and cylindrical lens. The laser diode may emit an uncollimated laser beam that diverges more in a first direction than in a second direction. The cylindrical lens may pre-collimate the uncollimated laser beam in the first direction to provide a partially collimated laser that diverges more in the second direction than in the first direction.

20 Claims, 6 Drawing Sheets

MICROROD COMPRESSION OF LASER BEAM IN COMBINATION WITH TRANSMIT LENS

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the vehicle's directional controls to cause the vehicle to navigate around the obstacle.

One such sensor is a light detection and ranging (LIDAR) device. A LIDAR actively estimates distances to environmental features while scanning through a scene to assembly a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene.

SUMMARY

A LIDAR device may transmit light pulses originating from one or more light sources and may receive reflected light pulses that are detected by one or more detectors. The LIDAR device may include a lens that both collimates the light from the one or more light sources and focuses the reflected light onto one or more detectors. Each light source may include a laser diode that emits an uncollimated laser beam that diverges more in a first direction than in a second direction and a cylindrical lens that pre-collimates the uncollimated laser beam in the first direction to provide a partially collimated laser beam.

In a first aspect, example embodiments provide a LIDAR device that includes at least one laser diode, at least one cylindrical lens, at least one detector, and an objective lens. The at least one laser diode is configured to emit an uncollimated laser beam that includes light in a narrow wavelength range. The uncollimated laser beam has a first divergence in a first direction and a second divergence in a second direction. The first divergence is greater than the second divergence. The at least one cylindrical lens is configured to pre-collimate the uncollimated laser beam in the first direction to provide a partially collimated laser beam that has a third divergence in the first direction and a fourth divergence in the second direction. The third divergence is less than the fourth divergence, and the fourth divergence is substantially equal to the second divergence. The at least one detector is configured to detect light having wavelengths in the narrow wavelength range. The objective lens is configured to (i) collimate the partially collimated laser beam to provide a collimated laser beam for transmission into an environment of the LIDAR device and (ii) focus object-reflected light onto the at least one detector. The object-reflected light includes light from the collimated laser beam that has reflected from one or more objects in the environment of the LIDAR device.

In a second aspect, example embodiments provide a LIDAR device that includes a plurality of light sources, in which each light source is configured to emit partially collimated light, a plurality of detectors, in which each detector is associated with a respective light source in the plurality of light sources, a lens, and a mirror. The lens is configured to (i) collimate the partially collimated light from the light sources to provide collimated light for transmission into an environment of the LIDAR device and (ii) focus onto each detector any object-reflected light from the detector's associated light source that has reflected from one or more objects in the environment of the LIDAR device. The mirror is configured to rotate about an axis and, while rotating, reflect the collimated light from the lens into the environment and reflect any object-reflected light from the environment into the lens.

In a third aspect, example embodiments provide a method. The method involves emitting an uncollimated laser beam from a laser diode. The uncollimated laser beam has a first divergence in a first direction and a second divergence in a second direction. The first divergence is greater than the second divergence. The method further involves pre-collimating the laser beam in the first direction to provide a partially collimated laser beam. The partially collimated laser beam has a third divergence in the first direction and a fourth divergence in the second direction. The third divergence is less than the fourth divergence, and the fourth divergence is substantially equal to the second divergence. The method also involves collimating, by a lens, the partially collimated laser beam to provide a collimated laser beam and transmitting the collimated laser beam into an environment. In addition, the method involves collecting object-reflected light and focusing, by the lens, the object-reflected light through a focusing path onto a detector. The object-reflected light includes light from the collimated laser beam that has reflected from one or more objects in the environment.

In a fourth aspect, exemplary embodiments provide a LIDAR device that includes means for transmitting an uncollimating laser beam that has a first divergence in a first direction and a second divergence in a second direction, in which the first divergence is greater than the second divergence. The LIDAR device further includes means for pre-collimating the uncollimated laser beam in the first direction to provide a partially collimated laser beam that has a third divergence in the first direction and a fourth divergence in the second direction, in which he third divergence is less than the fourth divergence and the fourth divergence is substantially equal to the second divergence. In addition, the LIDAR device includes means for collimating the partially collimated laser beam, means for transmitting the partially collimated laser beam into an environment of the LIDAR device, means for collecting object-reflected light that includes light from the collimated laser beam that has reflected from one or more objects in the environment, and means for focusing the object-reflected light onto a detector.

DETAILED DESCRIPTION

A LIDAR device may transmit light pulses originating from one or more light sources and may receive reflected light pulses that are detected by one or more detectors. The LIDAR device may include a transmit/receive lens that both collimates the light from the one or more light sources and focuses the reflected light onto the one or more detectors. By using a transmit/receive lens that performs both of these functions, instead of a transmit lens for collimating and a receive lens for focusing, advantages with respect to size, cost, and/or complexity can be provided.

Each light source may include a respective laser diode and cylindrical lens. The laser diode may emit an uncollimated laser beam that diverges more in a first direction than in a second direction. The cylindrical lens may pre-collimate the uncollimated laser beam in the first direction to provide a partially collimated laser beam, thereby reducing the divergence in the first direction. In some examples, the partially collimated laser beam diverges less in the first direction than in the second direction. The transmit/receive lens receives the partially collimated laser beams from the one or more light sources via a transmission path and collimates the partially collimated laser beams to provide collimated laser beams that are transmitted into an environment of the LIDAR device.

The collimated light transmitted from the LIDAR device into the environment may reflect from one or more objects in the environment to provide object-reflected light. The transmit/receive lens may collect the object-reflected light and focus the object-reflected light through a focusing path onto the one or more detectors. The transmission path through which the transmit/receive lens receives the light from the light sources may include a reflective element, such as a plane mirror or prism, that partially obstructs the focusing path. However, by providing partially collimated laser beams that diverge primarily in one direction, the beam widths of the partially collimated laser beams can be made relatively small in comparison to the aperture of the transmit/receive lens, as can the dimensions of the reflective element that accommodates the beam widths of the partially collimated laser beams.

Figure 1A:
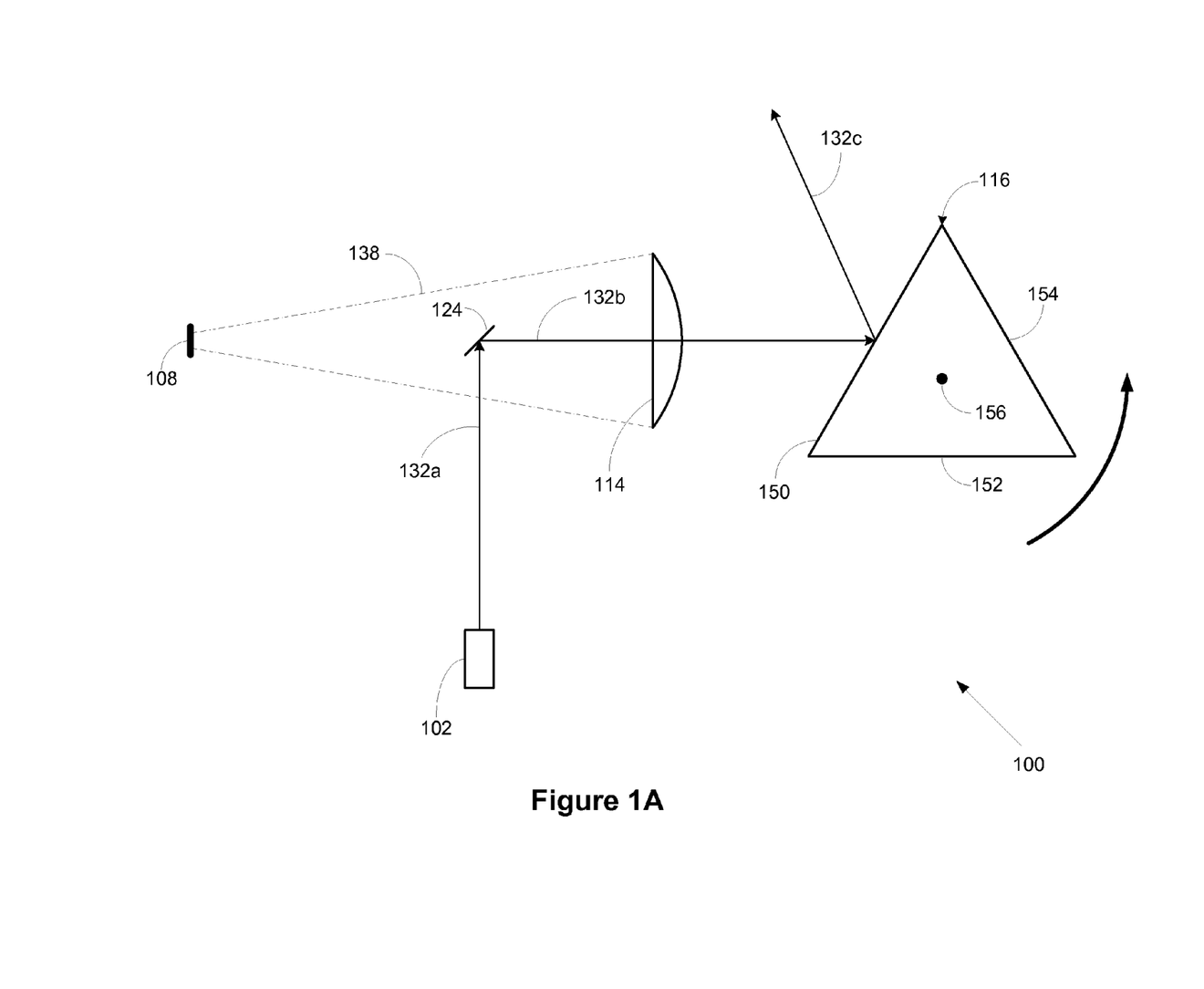
FIG. 1A is a top schematic view of a LIDAR device, in accordance with an example embodiment.
Figure 1B:
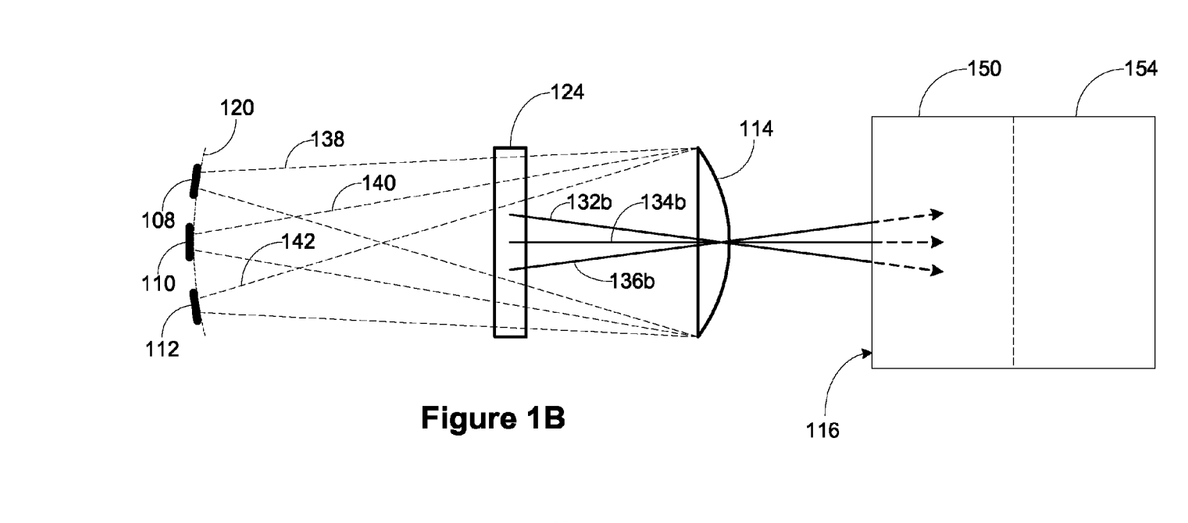
FIG. 1B is a side schematic view of a portion of the LIDAR device of FIG. 1A, in accordance with an example embodiment.
Figure 1C:
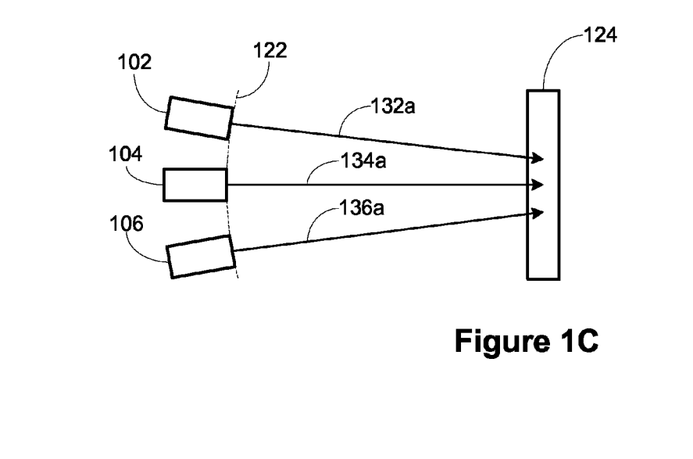
FIG. 1C is a front schematic view of a portion of the LIDAR device of FIG. 1A, in accordance with an example embodiment.

FIGS. 1A, 1B, and 1C illustrate an example LIDAR device 100. In this example, LIDAR device 100 includes light sources 102, 104, and 106 and detectors 108, 110, and 112. Each of light sources 102, 104, and 106 emits light in a wavelength range that can be detected by detectors 108, 110, and 112. The wavelength range could, for example, be in the ultraviolet, visible, and/or infrared portions of the electromagnetic spectrum. In some examples, the wavelength range is a narrow wavelength range, such as provided by lasers. In addition, the light emitted by light sources 102, 104, and 106 could be in the form of pulses.

The light that is emitted by light sources 102, 104, and 106 is collimated by a lens 114. The collimated light is then transmitted into an environment of LIDAR device 100 via a mirror 116. The light transmitted from LIDAR device 100 could be reflected by one or more objects in the environment. The light reflected from such objects may reach mirror 116 and be reflected into lens 114. Lens 114 may then focus the object-reflected light onto one or more of detectors 108, 110, and 112.

Within LIDAR device 100, light sources 102, 104, and 106 could be located in a different area than detectors 108, 110, and 112. As shown in FIG. 1B, detectors 108, 110, and 112 are arranged vertically in a focal plane 120 of lens 114. As shown in FIG. 1C, light sources 102, 104, and 106 are arranged vertically in a separately-located focal plane 122 of lens 114. Thus, as a top view of LIDAR device 100, FIG. 1A shows light source 102 as the top-most light source in focal plane 122 and shows detector 108 as the top-most detector in focal plane 120.

To reach lens 114, the light emitted from light sources 102, 104, and 106 may travel through a transmission path defined by one or more reflective elements, such as a plane mirror 124. In addition, light sources 102, 104, and 106 can be arranged to emit light in different directions. As shown in FIG. 1C, light sources 102, 104, and 106 emit light toward plane mirror 124 in directions indicated by rays 132a, 134a, and 136a, respectively. As shown in FIG. 1B, rays 132a, 134a, and 136a, are reflected by plane mirror 124, as rays 132b, 134b, and 136b, respectively. Rays 132b, 134b, and 136b then pass through lens 114 and are reflected by mirror 116. FIG. 1A shows that ray 132b is reflected by mirror 116 as ray 132c. Rays 134b and 136b may be similarly reflected by mirror 116 but in different vertical directions. In this regard, the vertical arrangement of light sources 102, 104, and 106, results in rays 132b, 134b, and 136b being incident upon mirror 116 at different vertical angles, so that mirror 116 reflects the light from light sources 102, 104, and 106 in different vertical directions.

Light from one or more of light sources 102, 104, and 106 transmitted by LIDAR device 100 via mirror 116 can be reflected back toward mirror 116 from one of more objects in the environment of LIDAR device 100 as object-reflected light. Mirror 116 can then reflect the object-reflected light into lens 114. As shown in FIG. 1B, lens 114 can focus the object-reflected light onto one or more of detectors 108, 110, and 112, via respective focusing paths 138, 140, and 142, depending on the angle at which lens 114 receives the object-reflected light.

The angle of the object-reflected light received by lens 114 may depend on which of light sources 102, 104, and 106 was the source of the object-reflected light. For example, lens 114 may focus object-reflected light originating from light source 102 onto detector 108 via focusing path 138, may focus object-reflected light originating from light source 104 onto detector 110 via focusing path 140, and may focus object-reflected light originating from light source 106 onto detector 112 via focusing path 142. In this way, LIDAR device 100 may define separate transmit/receive channels, such that light transmitted by a particular light source is received and detected by a particular detector.

Given the function of lens 114 of focusing object-reflected light onto one or more detectors, lens 114 could be described as an objective lens of LIDAR device 100. Further, lens 114 could have any shape that enables it to perform this focusing function. In some examples, lens 114 is an aspherical lens. The shape and focal length of the aspherical lens could be optimized for the wavelengths of light emitted by light sources 102, 104, and 106. For example, light sources 102, 104, and 106 could emit light with a wavelength of about 905 nm, and lens 114 could be an aspherical lens with a focal length of about 100 mm. Alternatively, lens 114 could be a spherical lens, such as a plano-convex lens or a biconvex lens.

As shown, plane mirror 124 partially obstructs focusing paths 138, 140, and 142, through which lens 114 focuses light onto detectors 108, 110, and 112. However, the amount of light loss caused by this obstruction can be made acceptably small by making the dimensions of plane mirror 124 small relative to the aperture of lens 114. As described in more detail below, plane mirror 124 can be made small in at least one dimension by partially collimating the light emitted by light sources 102, 104, and 106.

As described above, the light transmitted by LIDAR device 100 may be transmitted in a range of vertical directions, based on the vertical arrangement of light sources 102, 104, and 106 in focal plane 122. Alternatively or additionally, the light sources could have a horizontal arrangement in focal plane 122, so that the light transmitted by LIDAR device 100 is transmitted in a range of horizontal directions. Thus, while FIGS. 1A, 1B, and 1C show three light sources arranged vertically in focal plane 122, LIDAR device 100 could include a greater or fewer number of light sources, which light sources could be arranged horizontally and/or vertically in focal plane 122.

FIG. 1B also shows three detectors arranged vertically in focal plane 120. However, LIDAR device 100 could include a greater or fewer number of detectors, which detectors could be arranged horizontally and/or vertically in focal plane 120. As described above, each particular detector in LIDAR device 100 could be associated with a particular light source, such that light from that particular light source that is transmitted from LIDAR device 100 and then reflected by an object in the environment is focused by lens 114 onto that particular detector. These associations between light sources and detectors may define transmit/receive channels. Thus, in the example shown in FIGS. 1A, 1B and 1C, LIDAR device 100 has a first transmit/receive channel in which detector 108 is associated with light source 102, a second transmit/receive channel in which detector 110 is associated with light source 104, and a third transmit/receive channel in which detector 112 is associated with light source 106. In other examples, a LIDAR device could have a greater or fewer number of transmit/receive channels.

The use of multiple light sources and multiple detectors can allow LIDAR device 100 to interrogate multiple portions of its environment simultaneously or substantially simultaneously. For example, light sources 102, 104, and 106 could emit light pulses either simultaneously or in rapid succession according to a firing cycle.

The vertical arrangement of light sources 102, 104, and 106 enables LIDAR device 100 to transmit in multiple vertical directions, as described above. By moving mirror 116, LIDAR device 100 can also transmit in a range of horizontal directions. As shown, mirror 116 has three reflective surfaces 150, 152, and 154, and mirror 116 rotates about a vertical axis 156, as indicated by the curved arrow. In the configuration shown in FIG. 1A, ray 132*b* is incident on reflective surface 150 and is reflected as ray 132*c*. Rays 134*b* and 136*b* shown in FIG. 1B are similarly incident on reflective surface 150, resulting in respective reflective rays. As mirror 116 rotates, the angles of incidence of rays 132*b*, 134*b*, and 136*b* will change, which causes the directions of the reflected rays to change. In this way, the rotation of mirror 116 about vertical axis 156 can deflect the light from each of the light sources through a range of angles in the horizontal plane. Mirror 116 can also deflect the light from the light sources vertically. For example, reflective surfaces 150, 152, and 154 may each have a different tilt with respect to vertical axis 156.

Although FIG. 1A shows mirror 116 with three reflective surfaces, it is to be understood that mirror 116 could have a greater or fewer number of reflective surfaces. In addition, while mirror 116 has been described as rotating about vertical axis 156, mirror 116 could rotate about a horizontal axis or an axis in some other direction. In addition, instead of rotating, mirror 116 could oscillate through a range of angles. For example, mirror 116 could have a single reflective surface that wobbles back and forth about an axis without making a complete rotation.

In some examples, mirror 116 could be omitted. In order to transmit and receive through a range of horizontal directions, an optical assembly including light sources 102-106, detectors 108-112, lens 114, and mirror 124 could rotate together about a vertical axis. The optical assembly could spin about the vertical axis in a particular direction, or the optical assembly could oscillate back and forth though a range of angles about the vertical axis. The range of angles could be, for example, 180 degrees, 120 degrees, 60 degrees, 30 degrees, or any other range of angles that is less than a full rotation.

Figure 2A:
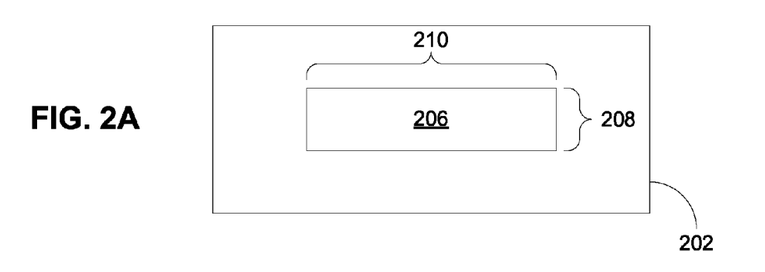
FIG. 2A is a view of a laser diode, in accordance with an example embodiment.
Figure 2B:
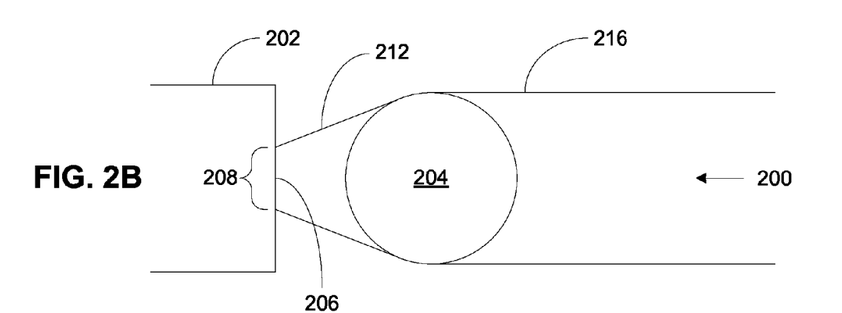
FIG. 2B is a view of the laser diode of FIG. 2A in combination with a cylindrical lens, in accordance with an example embodiment.
Figure 2C:
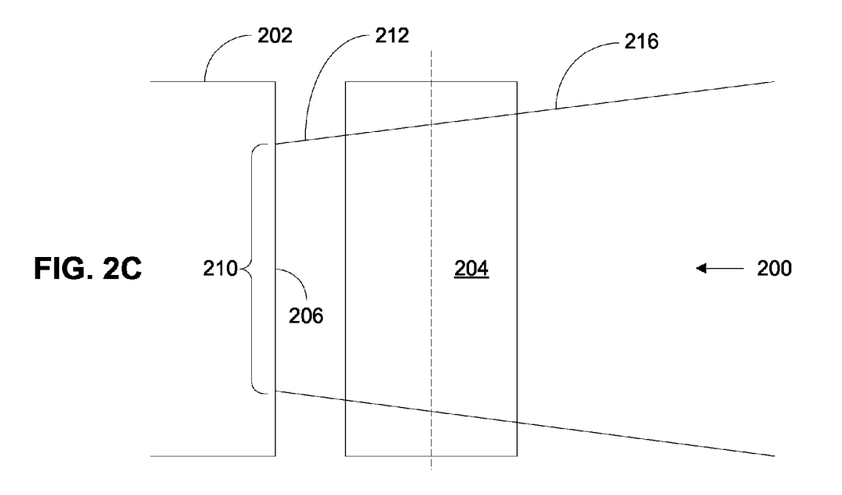
FIG. 2C is another view of the laser diode and cylindrical lens combination of FIG. 2B, in accordance with an example embodiment.

As noted above, the light from light sources 102, 104, and 106 could be partially collimated. FIGS. 2A, 2B, and 2C illustrate an example of how such partial collimation could be achieved. In this example, a light source 200 is made up of a laser diode 202 and a cylindrical lens 204. As shown in FIG. 2A, laser diode 202 has an aperture 206 with a shorter dimension corresponding to a fast axis 208 and a longer dimension corresponding to a slow axis 210. FIGS. 2B and 2C show an uncollimated laser beam 212 being emitted from laser diode 202. Laser beam 212 diverges in two directions, one direction defined by fast axis 208 and another, generally orthogonal direction defined slow axis 210. FIG. 2B shows the divergence of laser beam 212 along fast axis 208, whereas FIG. 2C shows the divergence of laser beam 212 along slow axis 210. Laser beam 212 diverges more quickly along fast axis 208 than along slow axis 210.

In one specific example, laser diode 202 is an Osram SPL DL90_3 nanostack pulsed laser diode that emits pulses of light with a range of wavelengths from about 896 nm to about 910 nm (a nominal wavelength of 905 nm). In this specific example, the aperture has a shorter dimension of about 10 microns, corresponding to its fast axis, and a longer dimension of about 200 microns, corresponding to its slow axis. The divergence of the laser beam in this specific example is about 25 degrees along the fast axis and about 11 degrees along the slow axis. When this type of laser diode is used in light sources 102, 104, and 106, lens 114 could be an aspherical lens with a focal length of about 100 mm. It is to be understood that this specific example is illustrative only. Laser diode 202 could have a different configuration, different aperture sizes, different beam divergences, and/or emit different wavelengths.

As shown in FIGS. 2B and 2C, cylindrical lens 204 may be positioned in front of aperture 206 with its cylinder axis 214 generally parallel to slow axis 210 and perpendicular to fast axis 208. In this arrangement, cylindrical lens 204 can pre-collimate laser beam 212 along fast axis 208, resulting in partially collimated laser beam 216. In some examples, this pre-collimation may reduce the divergence along fast axis 208 to about one degree or less. Nonetheless, laser beam 216 is only partially collimated because the divergence along slow axis 210 may be largely unchanged by cylindrical lens 204. Thus, whereas uncollimated laser beam 212 emitted by laser diode has a higher divergence along fast axis 208 than along slow axis 210, partially collimated laser beam 216 provided by cylindrical lens 204 may have a higher divergence along slow axis 210 than along fast axis 208. Further, the divergences along slow axis 210 in uncollimated laser beam 212 and in partially collimated laser beam 216 may be substantially equal.

In one example, cylindrical lens 204 is a microrod lens with a diameter of about 600 microns that is placed about 250 microns in front of aperture 206. The material of the microrod lens could be, for example, fused silica or a borosilicate crown glass, such as Schott BK7. Cylindrical lens 204 could also be used to provide magnification along fast axis 208. For example, if the dimensions of aperture 206 are 10 microns by 200 microns, as previously described, and cylindrical lens 204 is a microrod lens as described above, then cylindrical lens 204 may magnify the shorter dimension (corresponding to fast axis 208) by about 20 times. This magnification effectively stretches out the shorter dimension of aperture 206 to about the same as the longer dimension. As a result, when light from laser beam 216 is focused, for example, focused onto a detector, the focused spot could have a substantially square shape instead of the rectangular slit shape of aperture 206.

Figure 3:
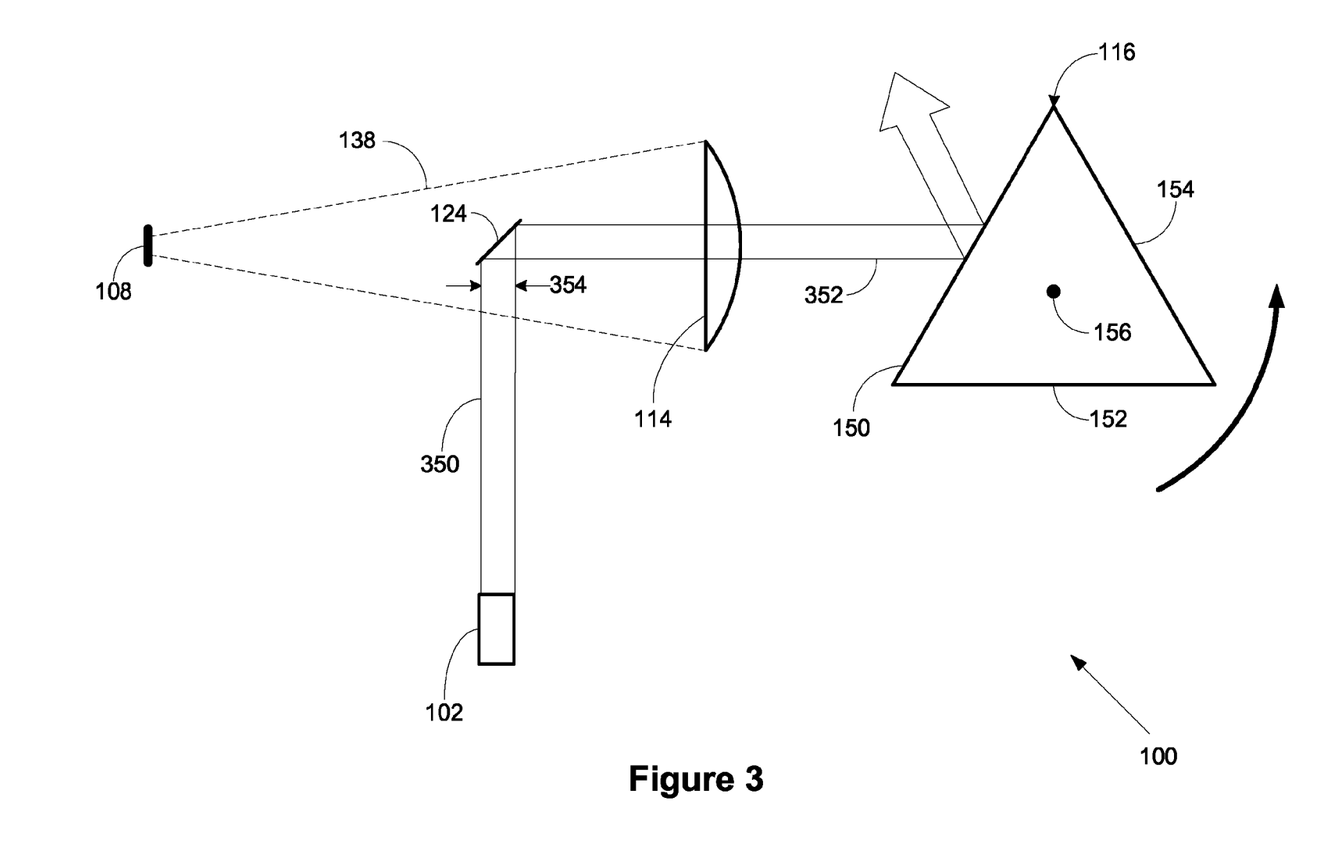
FIG. 3 is schematic diagram of the LIDAR device of FIG. 1A transmitting a collimated laser beam, in accordance with an example embodiment.

FIG. 3 illustrates a scenario in which light sources 102, 104, and 106 in LIDAR device 100 are each made up of a respective laser diode and cylindrical lens, for example, as shown in FIGS. 2A-2C. As shown, light source 102 emits a partially collimated laser beam 350 that is reflected by plane mirror 124 into lens 114. In this example, partially collimated laser beam 350 has less divergence in the horizontal plane (the drawing plane of FIG. 3) than in the vertical plane. Thus, the laser diode in light source 102 may be oriented with its fast axis in the horizontal plane and its slow axis in the vertical plane. For purposes of illustration, partially collimated laser beam 350 is shown in FIG. 3 with no divergence in horizontal plane. It is to be understood, however, that some amount of divergence is possible.

Lens 114 collimates partially collimated laser beam 350 to provide collimated laser beam 352 that is reflected by mirror 116 into the environment of LIDAR device 100. Light from collimated laser beam 352 may be reflected by one or more objects in the environment of LIDAR device 100. The object-reflected light may reach mirror 116 and be reflected into lens 114. Lens 114, in turn, focuses the object-reflected light through focusing path 138 onto detector 108. Although FIG. 3 shows a partially collimated laser beam from only light source 102, it is to be understood that light sources 104 and 106 could also emit partially collimated laser beams that are collimated by lens 114 to provide collimated laser beams that are transmitted from LIDAR device 100 via mirror 116. Thus, object-reflected light from the collimated laser beams originating from one or more of light sources 102, 104, and 106 may reach mirror 116 and be reflected into lens 114, which focuses the object-reflected light onto one or more of detectors 108, 110, and 112, respectively.

As shown in FIG. 3, the transmission path through which partially collimated laser beam 350 reaches lens 114 includes a plane mirror 124 that partially obstructs focusing path 138. However, the obstruction created by plane mirror 124 can be minimized by having the dimensions of plane 124 correspond to the dimensions of partially collimated laser beam 350 incident upon it. As shown, partially collimated laser beam 350 has a beam width 354 in the horizontal plane. Partially collimated laser beam 350 also has a beam width in the vertical plane (not shown), which could be substantially larger than beam width 354 due to the greater divergence in the vertical plane. To minimize obstruction of focusing path 138, plane mirror 124 could have horizontal and vertical dimensions that are just large enough to accommodate the horizontal and vertical beam widths of partially collimated laser beam 350, as well as the horizontal and vertical beam widths of the partially collimated laser beams emitted by light sources 104 and 106. As a result, plane mirror 124 could have a larger cross-section in the vertical plane than in the horizontal plane.

Figure 4:
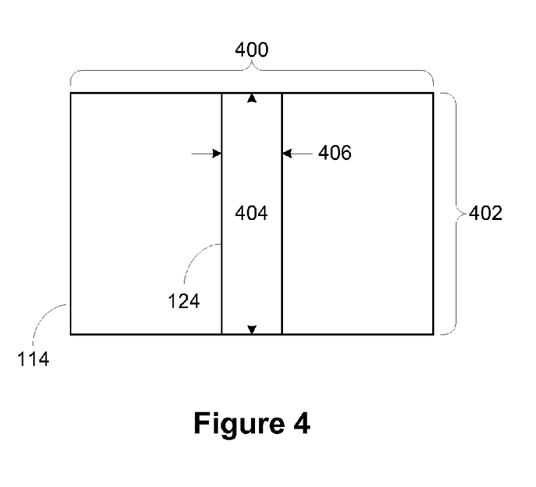
FIG. 4 is a view of an aperture of a lens in the LIDAR device of FIG. 1A, in accordance with an example embodiment.

To illustrate how the dimensions of plane mirror 124 may compare to the dimensions of lens 114 in order to minimize the obstruction of focusing path 138, FIG. 4, shows a view from mirror 116 of lens 114 and plane mirror 124 behind it. For purposes of illustration, lens 114 is shown with a generally rectangular aperture having a horizontal dimension 400 and a vertical dimension 402. Of course, other aperture shapes are possible as well. In this example, plane mirror 124 has a vertical dimension 404 that is the same or similar to vertical dimension 402 of lens 114, but plane mirror 124 has a horizontal dimension 406 that is much smaller than the horizontal dimension 400 of lens 114. By having horizontal dimension 406 of plane mirror 124 be only a fraction of horizontal dimension 400 of horizontal dimension 400 of lens 114, plane mirror 124 may obstruct only a fraction of the aperture of lens 114.

Figure 5A:
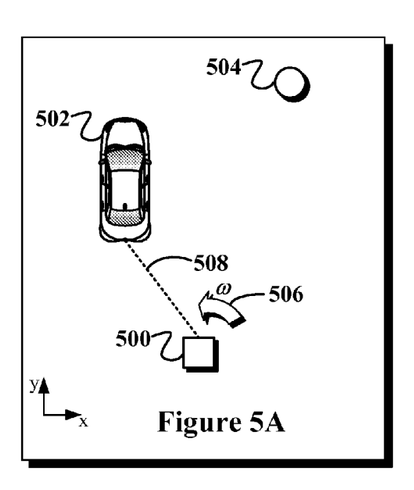
FIG. 5A illustrates a scenario in which LIDAR device scanning an environment that includes two objects, in accordance with an example embodiment.
Figure 5B:
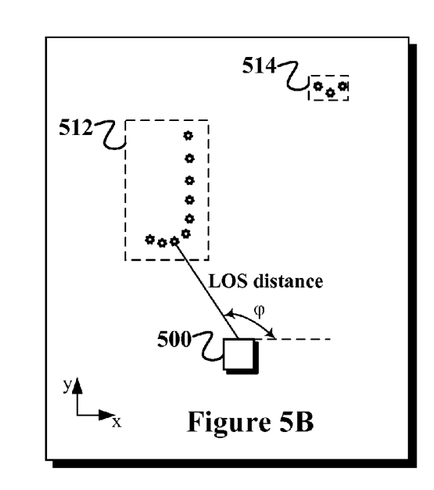
FIG. 5B illustrates a point cloud for the two objects scanned in the scenario illustrated in FIG. 5A, in accordance with an example embodiment.

FIGS. 5A and 5B illustrate an example application of a LIDAR device 500, which could have the same or similar configuration as LIDAR device 100 shown in FIG. 1. In this example application, LIDAR device 500 is used to scan an environment that includes a road. Thus, LIDAR device 500 could be in a vehicle, such as an autonomous vehicle, that is traveling on the road. The environment of LIDAR device 500 in this example includes another vehicle 502 and a road sign 504. To scan through the environment, LIDAR device 500 rotates a scanning element, which could be the same or similar to mirror 116, according to motion reference arrow 506 with angular velocity w. While rotating, LIDAR device 500 regularly (e.g., periodically) emits pulsed laser beams, such as laser beam 508. Light from the emitted laser beams is reflected by objects in the environment, such as vehicle 502 and sign 504, and are detected by one or more detectors in LIDAR device 500. Precisely time-stamping the receipt of the reflected signals allows for associating each reflected signal (if any is received at all) with the most recently emitted laser pulse and measuring the time delay between emission of the laser pulse and reception of the reflected light. The time delay provides an estimate of the distance to the reflective feature based on the speed of light in the intervening atmosphere. Combining the distance information for each reflected signal with the orientation of scanning element in LIDAR device 500 for the respective pulse emission allows for determining a position of the reflective feature in three-dimensions.

FIG. 5B symbolically illustrates a point cloud resulting from LIDAR device 500 scanning the environment shown in FIG. 5A. For purposes of illustration, the scan is assumed to be in an x-y plane that is generally horizontal (e.g., parallel to the surface of the road). It is to be understood, however, that the scan could include a vertical component (z-dimension) as well. In this example, the point cloud includes spatial points 512 corresponding to reflections from vehicle 502 and spatial points 514 corresponding to reflections from sign 504. Each spatial point in the point cloud has a line of sight ("LOS") distance from LIDAR device 500 and an azimuthal angle ϕ in the x-y plane. In this way, the scanning by LIDAR 500 can provide information regarding the locations of reflective objects in its environment.

Figure 6:
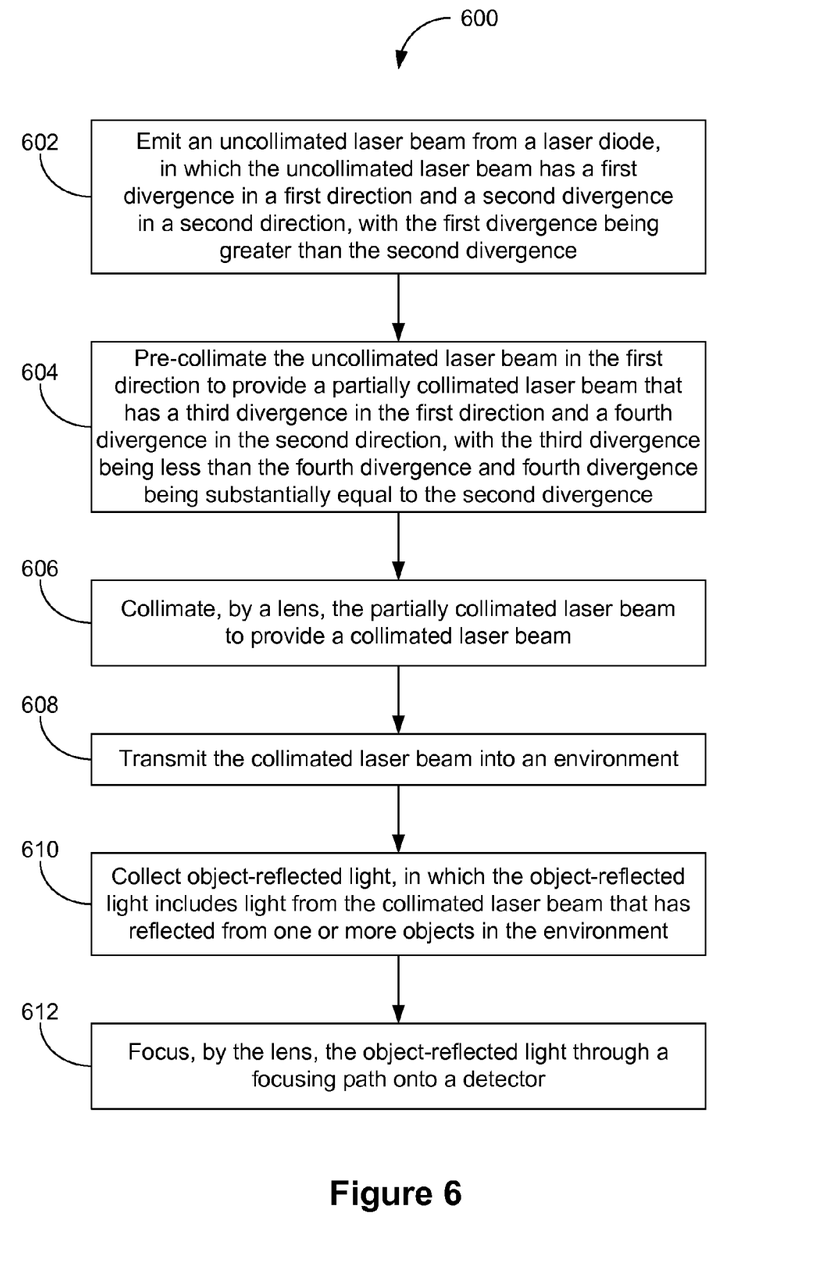
FIG. 6 is a flow chart of a method, in accordance with an example embodiment.

FIG. 6 is a flow chart of an example method 600 of operating a LIDAR device, such as LIDAR device 100. Method 600 involves emitting an uncollimated laser beam from a laser diode, in which the laser beam has a first divergence in a first direction and a second divergence in a second direction, with the first divergence being greater than the second divergence (block 602). The laser diode could be configured as shown in FIGS. 2A-2C with a fast axis and a slow axis. Thus, the first direction could correspond to the fast axis and the second direction could correspond to the slow axis.

Method 600 further involves pre-collimating the uncollimated laser beam in the first direction to provide a partially collimated laser beam that has a third divergence in the first direction and a fourth divergence in the second direction, with the third divergence being less than the fourth divergence and the fourth divergence being substantially equal to the second divergence (block 604). The pre-collimation could be achieved by transmitting the laser beam through a cylindrical lens, as shown in FIGS. 2B and 2C and described above. Thus, the cylindrical lens could reduce the divergence along the fast axis so that it becomes less than the divergence along the slow axis, while keeping the divergence along the slow axis substantially the same.

A lens, such as lens 114 shown in FIGS. 1A and 1B, collimates the partially collimated laser beam to provide a collimated laser beam (block 606). The lens could be an aspherical lens or a spherical lens. The collimated laser beam is then transmitted into an environment (block 608). Transmitting the collimating laser beam into the environment could involve a rotating mirror, such as mirror 116, reflecting the collimated laser beam from the lens into the environment.

Method 600 also involves collecting object-reflected light, in which the object-reflected light includes light from the collimated laser beam that has reflected from one or more objects in the environment (block 610). Collecting the object-reflected light could involve a rotating mirror, such as mirror 116, reflecting the object-reflected light from the environment into the lens used to collimate the laser beam. The lens may also focus the object-reflected light through a focusing path onto a detector (block 612). In some examples, the lens may receive the partially collimated laser beam via a reflective element, such as a plane mirror or prism, that partially obstructs the focusing path. However, as discussed above, the obstruction can be minimized by having the dimensions of the reflective element match the dimensions of the partially collimated laser beam.

Although method 600 has been described with respect to one laser diode, it is to be understood that multiple laser diodes could be used, each emitting a respective laser beam that is transmitted into the environment as a collimated laser beam. The collimated laser beams could be transmitted simultaneously or sequentially. Further, the collimated laser beam could be transmitted in different direction. The object-reflected light that is collected could include light from any of the transmitted collimated laser beams.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A light detection and ranging (LIDAR) device, comprising:
   at least one laser diode, wherein the at least one laser diode is configured to emit an uncollimated laser beam comprising light in a narrow wavelength range, wherein the uncollimated laser beam has a first divergence in a first direction and a second divergence in a second direction, and wherein the first divergence is greater than the second divergence;
   at least one cylindrical lens, wherein the at least one cylindrical lens is configured to pre-collimate the uncollimated laser beam in the first direction to provide a partially collimated laser beam that has a third divergence in the first direction and a fourth divergence in the second direction, wherein the third divergence is less than the fourth divergence and the fourth divergence is substantially equal to the second divergence;
   at least one detector, wherein the at least one detector is configured to detect light having wavelengths in the narrow wavelength range; and
   an objective lens, wherein the objective lens is configured to (i) collimate the partially collimated laser beam to provide a collimated laser beam for transmission into an environment of the LIDAR device and (ii) focus object-reflected light onto the at least one detector, wherein the object-reflected light comprises light from the collimated laser beam that has reflected from one or more objects in the environment of the LIDAR device.

2. The LIDAR device of claim 1, wherein the objective lens receives the partially collimated laser beam via a transmission path and focuses the object-reflected light through a focusing path, and wherein the transmission path includes a reflective element that partially obstructs the focusing path.

3. The LIDAR device of claim 2, wherein the reflective element comprises a plane mirror.

4. The LIDAR device of claim 1, wherein the at least one laser diode comprises a plurality of laser diodes, the at least one detector comprises a plurality of detectors, and the at least one cylindrical lens comprises a plurality of cylindrical lenses, such that each cylindrical lens in the plurality of cylindrical lenses is associated with a corresponding laser diode in the plurality of laser diodes.

5. The LIDAR device of claim 4, wherein each laser diode is configured to emit a respective uncollimated laser beam in a respective direction, and wherein each cylindrical lens is configured to pre-collimate the uncollimated laser beam produced by its corresponding laser diode to provide a corresponding partially collimated laser beam that is then collimated by the objective lens to provide a corresponding collimated laser beam.

6. The LIDAR device of claim 5, wherein each detector in the plurality of detectors is associated with a corresponding laser diode in the plurality of laser diodes, and wherein the objective lens is configured to focus onto each detector a respective portion of the object-reflected light that comprises light from the detector's corresponding laser diode.

7. The LIDAR device of claim 6, wherein each laser diode has a rectangular aperture that has a short dimension and a long dimension, and wherein each cylindrical lens is configured to magnify the short dimension of the aperture of its corresponding laser diode such that the light from the laser diode that is focused onto the laser diode's corresponding detector has a substantially square shape.

8. The LIDAR device of claim 1, wherein the at least one cylindrical lens comprises at least one microrod lens.

9. The LIDAR device of claim 1, wherein the narrow wavelength range includes wavelengths of about 905 nanometers.

10. The LIDAR device of claim 1, wherein the objective lens is an aspherical lens.

11. The LIDAR device of claim 1, further comprising a mirror, wherein the mirror is configured to reflect the collimated laser beam from the objective lens into the environment and to reflect the object-reflected light from the environment into the objective lens.

12. The LIDAR device of claim 11, wherein the mirror rotates about a vertical axis.

13. The LIDAR device of claim 12, wherein the mirror comprises a plurality of reflective surfaces, each reflective surface having a different tilt with respect to the vertical axis.

14. A light detection and ranging (LIDAR) device, comprising:
   a plurality of light sources, wherein each light source is configured to emit partially collimated light;
   a plurality of detectors, wherein each detector in the plurality of detectors is associated with a respective light source in the plurality of light sources;
   a first mirror, wherein the first mirror is configured to reflect the partially collimated light from the light sources;
   a second mirror, wherein the second mirror is configured to rotate about an axis; and
   a lens, wherein the lens is configured to (i) receive, via the first mirror, the partially collimated light from the light sources, (ii) collimate the partially collimated light from the light sources to provide collimated light, wherein the second mirror is configured to reflect the collimated light from the lens into an environment of the LIDAR device, and (iii) focus, via a focusing path, onto each detector any object-reflected light from the detector's associated light source that has reflected from one or more objects in the environment of the LIDAR device, wherein the second mirror is configured to reflect the object-reflected light from the environment into the lens, wherein the first mirror partially obstructs the focusing path.

15. The LIDAR device of claim 14, wherein each light source in the plurality of light sources comprises a respective laser diode and a respective cylindrical lens.

16. The LIDAR device of claim 14, wherein the second mirror comprises a plurality of reflective surfaces, each reflective surface having a different tilt with respect to the axis.

17. A method comprising:
   emitting an uncollimated laser beam from a laser diode, wherein the uncollimated laser beam has a first divergence in a first direction and a second divergence in a second direction, and wherein the first divergence is greater than the second divergence;
   pre-collimating the uncollimated laser beam in the first direction to provide a partially collimated laser beam, wherein the partially collimated laser beam has a third divergence in the first direction and a fourth divergence in the second direction, and wherein the third divergence is less than the fourth divergence and the fourth divergence is substantially equal to the second divergence;
   collimating, by a lens, the partially collimated laser beam to provide a collimated laser beam;
   transmitting the collimated laser beam into an environment;
   collecting object-reflected light, wherein the object-reflected light comprises light from the collimated laser beam that has reflected from one or more objects in the environment; and
   focusing, by the lens, the object-reflected light through a focusing path onto a detector, wherein the lens receives the partially collimated laser beam via a plane mirror that partially obstructs the focusing path.

18. The method of claim 17, wherein pre-collimating the uncollimated laser beam in the first direction to provide a partially collimated laser beam comprises transmitting the uncollimated laser beam through a cylindrical lens.

19. The method of claim 17, wherein transmitting the collimated laser beam into an environment comprises a rotating mirror reflecting the collimated laser beam from the lens into the environment, and wherein collecting object-reflected light comprises the rotating mirror reflecting the object-reflected light from the environment into the lens.

20. The method of claim 17, further comprising:
   rotating an optical assembly about an axis while transmitting the collimated laser beam into the environment and collecting object-reflected light, wherein the optical assembly includes the laser diode, the lens, the detector, and the plane mirror.

* * * * *